United States Patent
Vaton

(10) Patent No.: US 6,311,635 B1
(45) Date of Patent: Nov. 6, 2001

(54) MONOHULL HAVING STERN STABILIZERS FOR A HIGH SPEED SHIP

(75) Inventor: Gilles Vaton, 19, Quai de Rive-Neuve, Marseilles 13007 (FR)

(73) Assignees: Gilles Vaton; Bernard Largillier, both of Marseille (FR)

( * ) Notice: Subject to any disclaimer, the term of this patent is extended or adjusted under 35 U.S.C. 154(b) by 0 days.

(21) Appl. No.: 09/446,669

(22) PCT Filed: Jun. 24, 1998

(86) PCT No.: PCT/FR98/01340

§ 371 Date: Jan. 31, 2000

§ 102(e) Date: Jan. 31, 2000

(87) PCT Pub. No.: WO99/00291

PCT Pub. Date: Jan. 7, 1999

(30) Foreign Application Priority Data

Jun. 27, 1997 (FR) .................................................. 97 08304

(51) Int. Cl.⁷ ................................. B63B 1/16; B63B 1/00
(52) U.S. Cl. ............................................. 114/272; 114/61.2
(58) Field of Search ............................... 114/61.1, 61.11, 114/61.12, 61.2, 61.26, 280, 123, 272; D12/300

(56) References Cited

U.S. PATENT DOCUMENTS

| | | | |
|---|---|---|---|
| D. 285,679 | * | 9/1986 | Kachler ................................. D12/309 |
| D. 326,840 | * | 6/1992 | Bullock ................................. D12/302 |
| 3,965,836 | * | 6/1976 | Malvestuto, Jr. ..................... 114/272 |
| 4,095,549 | * | 6/1978 | Williams ............................... 114/283 |
| 4,538,537 | * | 9/1985 | Nonnecke ............................. 114/57 |
| 5,178,085 | * | 1/1993 | Hsu ...................................... 114/61 |
| 5,488,918 | * | 2/1996 | Johnson, Jr. et al. ................ 114/56 |
| 5,529,009 | | 6/1996 | Faury et al. . |
| 5,655,473 | * | 8/1997 | Arvilla .................................. 114/61 |
| 5,701,835 | * | 12/1997 | Borseth ............................. 114/61.27 |
| 5,823,130 | * | 10/1998 | Kreyn et al. .......................... 114/61 |
| 6,044,784 | * | 4/2000 | Gee et al. ......................... 114/61.15 |

FOREIGN PATENT DOCUMENTS

| | | | |
|---|---|---|---|
| 0 495 722 A1 | 7/1992 | (EP) | ................................. B63B/1/12 |
| 2 460 250 | 1/1981 | (FR) | ................................. B63B/1/10 |
| 2 671 775 | 7/1992 | (FR) | ................................. B63B/1/14 |
| 2 675 460 | 10/1992 | (FR) | ................................. B63B/9/08 |
| 2 305 400 | 4/1997 | (GB) | ................................. B63B/43/14 |

OTHER PUBLICATIONS

*Trimarans—the shape of the future?*, Ship & Boat International, Jun. 1996, pp. 17, 18, 19, 21.
International Preliminary Examination Report, dated Jun. 24, 1998 (in French).
International Search Report, dated Oct. 16, 1998 (in English).

* cited by examiner

Primary Examiner—S. Joseph Morano
Assistant Examiner—Andrew Wright
(74) Attorney, Agent, or Firm—Cohen, Pontani, Lieberman & Pavane

(57) ABSTRACT

The technical field of the invention is that of ship building, more particularly making ship hulls. A monohull with stern stabilizers, also known as a pseudo-trimaran, for constituting a very high-speed ship comprises a central float (1) and two shorter side floats (2) situated towards the stern of the central float (1) and connected thereto by faired link arms (5); according to the invention, the underwater portions of the three floats (1, 2) are always immersed at least in part and regardless of speed, with the side floats (2) having tiltable underwater foils (3) and with the fineness coefficients of the three floats lying in the range 0.25 to 0.35, with ratios of length over beam lying in the range 12 to 20, and with the ratio of the length of the central float over the length of the side floats lying in the range 2.5 to 4.5.

11 Claims, 4 Drawing Sheets

MONOHULL HAVING STERN STABILIZERS FOR A HIGH SPEED SHIP

BACKGROUND OF THE INVENTION

1. Field of the Invention

The present invention relates to monohulls with stern stabilizers for high-speed ships.

The technical field of the invention is that of ship building, and more particularly manufacturing ship hulls.

2. Description of the Related Art

The main application of the invention is building high-speed ships, i.e. capable of more than 38 knots or as much as 54 knots or even more, of mean length greater than 50 meters (m), and capable of carrying in particular passengers and vehicles both for civilian and for naval uses.

Over thousands of years, boat building has made considerable progress in ship propulsion for increasing speed and endurance: starting from muscle power in the time of the ancient Egyptians to wind power, and then to steam and oil and recently atomic energy. However during this revolution in terms of drive, hulls have hardly changed at all: monohulls have always been favored because of simplicity, light weight, and buoyancy, both static and dynamic, even though stability, at least in terms of comfort, is not perfect.

However, over the last few years, numerous novel designs have been studied and developed to take the place of the monohull with the purpose of achieving greater speed and better stability, with this being at the request both of navies and of shipping companies; shipping companies would like to become much more competitive than airlines by seeking to reduce the time required to cross an ocean to half or less while being capable of carrying many more passengers than can be carried by a large airliner. Nevertheless, it is clear that many very large vessels are probably going to remain monohulls for a long time yet, particularly in circumstances where neither stability nor high speed are considered as being major advantages, such as in transporting oil, for example.

To achieve high speeds, i.e. speeds greater than 30 knots, various types of hull have been developed, some making use solely of hydrostatic support like monohulls but by increasing the number of hulls, as with catamarans and trimarans in particular; hydrodynamic support has also been used by means of underwater "wings" which serve to lift the load-carrying hull out of the water above a certain speed; other principles have been developed, in particular those using aerostatic support, such as air cushion vehicles.

The present invention makes use of all of those support principles on the basis of a trimaran type design; until now, development and implementations of three-hulled ships have been associated essentially with recreational boating and in particular with sailing, specifically for the purpose of beating speed records: however, in that type of use, the float situated upwind from the central hull is functionally practically unused, the boat then being supported by the central float and by the side float on the downwind side. Various trimaran hull designs have also been developed to beat mechanical propulsion speed records, but without seeking to carry goods or passengers, for example the ship described in Australian patent application AU 521518: that relates to a kind of trimaran having three hydroskis enabling it to travel on three support surfaces disposed in a triangular configuration, one at the bow and the other two at the stern, and enabling the hull to be lifted completely out of the water, but that cannot be extrapolated to a heavy transport ship for carrying passengers or vehicles.

In the field of commercial transport, rather few projects have been developed. French published patent applications FR 2671775 and FR 2675460, corresponding to U.S. Pat. No. 5,529,009, describe multi-hull ships, none of which have been built at this time, doubtless because of problems relating essentially to stability and cost. These publications relate to hulls in which the superstructures and the central float are rather conventional, even though the side floats are quite fine, but incapable of achieving maximum speeds in excess of 40 knots. In addition, the hulls are rather heavy and the usable portions of their superstructures and their overall centers of gravity are placed very high above the water.

In any event, at present and without profligate use of power for propulsion purposes which then makes the ship uncomfortable because of vibration and which is not economically feasible, no high-speed ship can travel faster than 35 knots under normal circumstances because the ship is limited by hydrodynamic resistance to forward travel which increases with the cube of speed, specifically for high speeds in excess of 30 to 35 knots.

The problem posed is thus to be able to make ships capable of transporting passengers and/or freight, such as vehicles for the most part, that is at least 50 m long, that is suitable for traveling at high speed in excess of 40 knots and even of 50 to 60 knots, whatever the weather conditions, while maintaining acceptable stability in terms of rolling and pitching, firstly to make it comfortable to travel in, in particular for passengers, and secondly to avoid overstressing the structures of the hulls which must be simple to manufacture, rigid, and strong.

SUMMARY OF THE INVENTION

A solution to the problem posed is a ship hull comprising a central main float and two side floats of shorter length, situated towards the stern of the central float, connected thereto by link arms, and having underwater foils. The underwater portions of all three floats are always immersed at least in part and should therefore always be considered as forming a moving hull regardless of speed and of weather conditions. The fineness or block coefficients of the three floats lies in the range 0.25 to 0.35 with ratios of length over beam lying in the range 12 to 20, and with a ratio of the length of the central hull over the length of the lateral hulls lying in the range 2.5 to 4.5.

This basic design using a very long central hull, as described in greater detail below, provides very low resistance to forward motion and efficient behavior in short swells of the kind found in closed or semiclosed seas such as the Mediterranean or the Channel. Transverse stability is provided by the stern floats which might cause the hull of the invention to be referred to as a "trimaran" even though it is more of a "pseudo-trimaran"; such stern floats, as defined by their characteristics as specified below, give the ship remarkable behavior which is unlike that of a catamaran because of the long period roll to which they give rise; roll is also controlled by the effectiveness of the stabilizer foils which are preferably movable and tiltable in alternating operation so as to be always of positive incidence, i.e. providing lift that is always directed upwards. Such underwater stabilizers or foils also provide a hydrodynamic support effect contributing to reducing the displacement of the stern portion of the central hull above a certain speed.

Furthermore, to provide good transverse stability for a moderate overall width of the hull, while maintaining minimum drag and a one-piece structure for said pseudo-trimaran assembly, these small stern floats that are lightly immersed have a rather large stem slenderness ratio with a V-shape giving very fine penetration into the water, and lightly immersed towards the stern, giving movement that is very gentle and practically self-stable at speed.

Pitching is minimized by a shape that is likewise a narrow V-shape for the stem of the central float, giving it fine penetration into the water and little rake, thus enabling the hull to be referred to as a "wave-cutter"; the stern position of the floats also tends to interrupt quickly any pitching that might begin in a swell.

To assist in this basic design which is described in the description of the figures below, and to respond to the problem posed, the link arms of the invention are faired to have airplane wing shapes, thereby creating two ground effect nozzles between inner abovewater side surfaces of the central float and the side floats, and the liquid surface over which the trimaran hull is moving. These link arm wings are of relatively small span but of large chord, traveling at a height lying between one-half and one-fourth of the mean chord above the water. Aerodynamic support is thus obtained due to the dynamic pressure obtained by air being accelerated as it passes through these kinds of nozzles constituted by the undersides of the link arm wings connecting the floats to the central hull, and the surface of the water. This dynamic pressure increases with speed; calculated estimates have made it possible to assess that for a lift area of each link arm Ad abut 220 m$^2$, and at a speed of 40 to 50 knots, this ground effect produces lift of the order of 50 to 60 metric to for these wing-shaped arms a curved profile of the type known as the Gottingen type, for example the type referred to as G652 (arched). The combination of this "hyperlift" with that obtained by the underwater stabilizers, also known in the present technical field as "foils", and which are secured to the side floats, which foils form respective surface areas of about 6 m$^2$ each, and for a speed lying in the range 40 knots to 50 knots, also give lift of the order of 60 tons, makes it possible for the total lightening that is obtained to be of the order of 20% of the mass of a ship that displaces 550 tons, corresponding to the areas mentioned above, i.e. a length of about 100 m and the ship considered when half laden.

In addition, other characteristics of the invention combine with those described above to respond to the problem posed and to provide additional advantages, in particular:

- to obtain sufficient thrust to enable such speeds of at least 40 to 50 knots to be obtained, propulsion is provided by at least one waterjet and preferably by two, exiting from the stern portion of the central float, preferably associated with one other waterjet thruster or "hydrojet" situated at the stern of each of the side floats, thus preferably giving a total of four waterjets; the ejection nozzles for these waterjets are preferably steerable upwards and downwards through about 12° relative to the horizontal, adding to the above-described effects of the underwater foils, of the hull shapes, and of the link arm shapes, for the purpose of reducing pitching and rolling motion: the movements of said nozzles and of said foils are, for this purpose, servo-controlled from an inertial unit;
- to provide and maintain such high speeds, given the large amount of drag developed by the portions in air at such speeds in excess of 40 knots, the portions in air i.e. the superstructures or deadwork of the hull are optimally aerodynamic, with the front ends of the corresponding hull portions being rounded in shape, like an airplane fuselage; the deadwork does not have any projections, nor does it have any sharp edges so as to obtain a minimum drag coefficient relative to wind. In addition, the central float has a vertical tail fin at its stern which is provided with a movable control surface, thus constituting a natural stabilizer and delivering a small amount of thrust from the side opposite to the apparent wind; a balance is also established between the lift obtained by this rear air-foil which can be controlled using its control surface for steering purposes, and the front deadwork area of the central float; and
- in order to give the ship at a speed in excess of 45 knots a horizontal trim and a maximum waterline length so as to minimize energy consumption, the ship hull of the invention, at rest, has slightly negative trim corresponding to its stem pitching down slightly. It will be observed that conventional ships in motion always move down towards the stern when it is desired to exceed a speed of 45 knots: thus by rearing up, they cannot, in fact, exceed this speed of 45 knots. In the present invention, the combination of the support provided by the stern side floats, the immersed foils, and the lift-providing wings of the support arms prevent this downward deflection of the stern or rearing up of the stem, and even leads to the stern being raised, consequently keeping the ship horizontal on these lines even at 45 knots, thereby enabling it to exceed this speed.

The result is a novel design of monohull having stern stabilizers, also referred to as a "pseudo-trimaran" hull, for a high speed ship capable of satisfying the problem posed with the various advantages mentioned above. The solution described in the present invention for achieving the speeds indicated and for exceeding the 30 to 35 knots of present ships under normal propulsion, is to reduce a portion of the hydrodynamic drag, thereby making it possible to achieve speeds of about 50 to 60 knots (100 to 115 km/h) with power levels that are still reasonable (35,000 horsepower for a ship having the dimensions given above). From speeds of about 35 knots and because of the special configuration of the hull of the invention, selfstabilizing occurs automatically to some extent, making it possible to increase speed by about 15 to 25 knots while requiring only relatively little additional power; in any event, the drag of the hull of the invention does not increase with the cube of speed for speeds in excess of 30 to 35 knots.

In addition, the pseudo-trimaran hull of the present invention makes it possible to have rather low total height on the water while retaining large capacity (as can be seen from the accompanying figures), when compared with presently-known trimaran hulls: for a central hull having a length of 100 m or more, the overall height above the water is no more than 10 m, with the link arm being at a height of 3 m to 6 m above the water and with the vessel having an overall width of 30 m to 35 m, for example.

Such a hull makes it possible to carry passengers in comfort that can be considered as being equivalent to that of an airplane, and vehicles and/or loaded containers in the hold of the central float alone via stern access that is closed by any suitable door of conventional design and that can be very simple. It should be observed that only the abovewater volume of the central float is fitted for transporting passengers and freight, the remaining volumes being constituted by leakproof compartments, most of which are filled with closed-cell foam so as to guarantee that the vessel is unsinkable.

In addition, the structure of the central float can be overdimensioned and by having a dual-cone shape provides a high level of stiffness to the beam of the ship so there are no alternating stresses, thus making it possible to expect at least 25 years of service life: the dual-cone shape is characterized by a section that is larger in the longitudinal mid-portion of the float than at its bow and stern ends; without excessively penalizing overall displacement, the thickness of the hull skin can be about three times that laid down by classification authorities, which is required because of the high speeds reached and which is made possible by the special design of the ship of the invention which reduces the surface area of the hull skin.

In spite of its rather unusual and highly innovative appearance, this ship can be built in a manner that is very simple and indeed unsophisticated, building up a structure of various materials and using skins that are easy to shape. When making ships of lengths of the order of 50 m to 115 m, the selected material can be aluminum, and for sizes in the 120 m to 150 m range, the material can be steel or a combination of materials.

Other characteristics and advantages of the present invention could be described, but those mentioned above suffice already to show the novelty and the advantage of the invention.

The following description and figures relate to an embodiment of the invention but have no limiting character: other embodiments are possible within the ambit of the scope of the extent of the invention, in particular by changing certain details of shape for the superstructures and the disposition of the internal arrangements.

BRIEF DESCRIPTION OF THE DRAWINGS

The FIG. 1 is a plan view of a trimaran hull of the invention.

DETAILED DESCRIPTION OF THE PRESENTLY PREFERRED EMBODIMENTS

Figure 1:
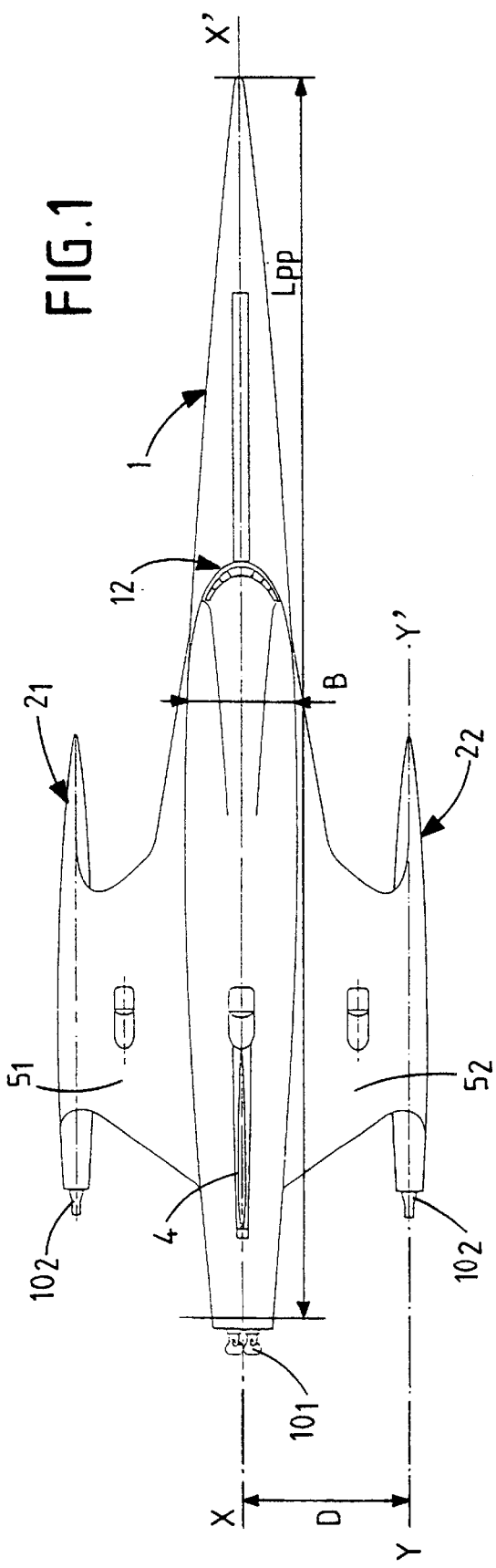
Figure 2:
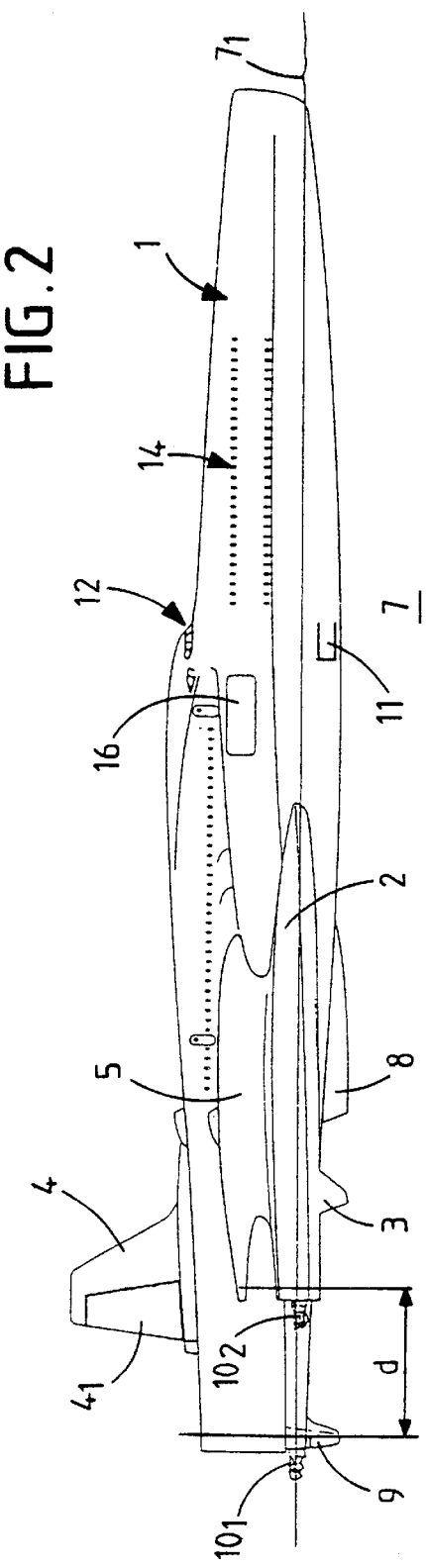
FIG. 2 is a side view showing the profile of the FIG. 1 hull.
Figure 3:
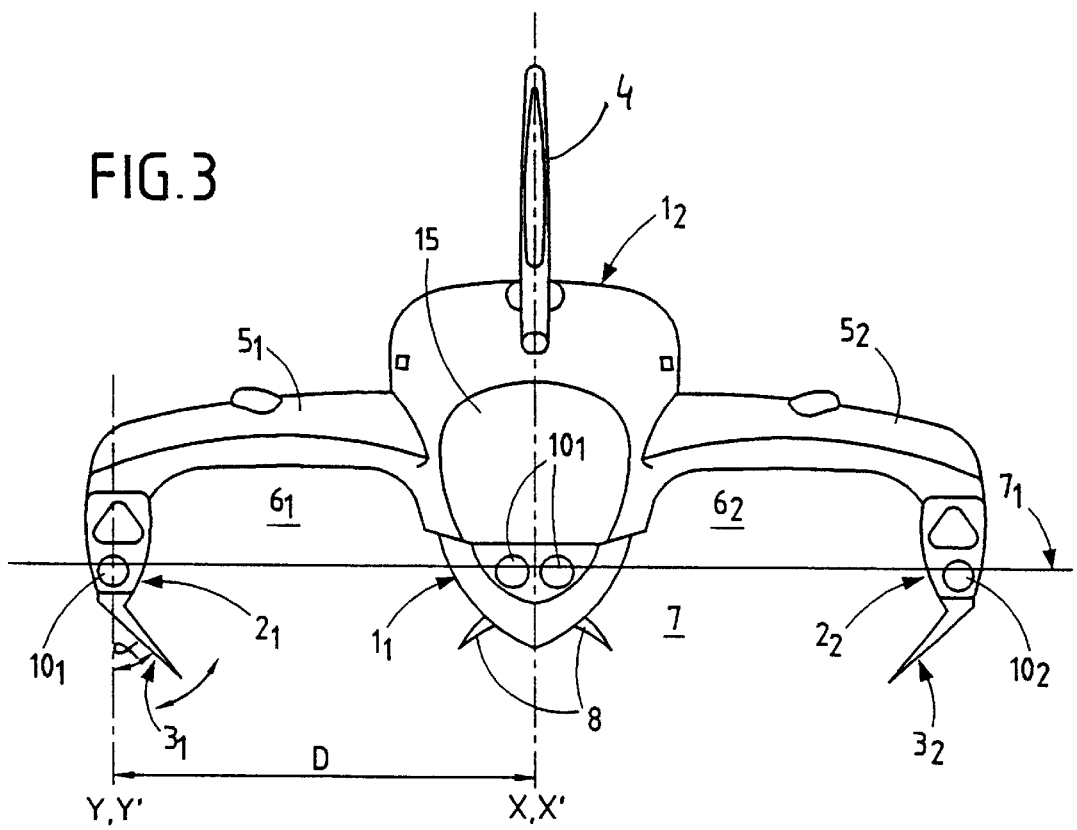
FIG. 3 is a stern view of the FIG. 1 hull.

Together, the figures thus show a pseudo-trimaran hull for a very high speed vessel comprising in conventional manner a central float 1 and two shorter side floats 2 situated towards the stern of the central float 1 and connected thereto by link arms 5. The underwater parts of the three floats 1 and 2 are always underwater regardless of speed and weather conditions and ensure travel in which the passenger transport and/or freight decks are maintained quasi-horizontal. For this purpose and amongst other things, the underwater parts of the side floats 2 include underwater foils 3 that are tiltable from an angle alpha equal to about 45° in the midposition relative to the vertical midplane YY' of each float 2 and extending towards the inside of the hull towards the central float 1. The foils 3 are preferably hinged beneath each side float 2 and capable of tilting at least between 40° and 50°.

These stabilizing foils can, for example, have a so-called "Vaton" profile, being of the type defined by Vaton and as manufactured on the vessel Charles Heidsieck IV in 1984/85.

Figures 4A, 4B:
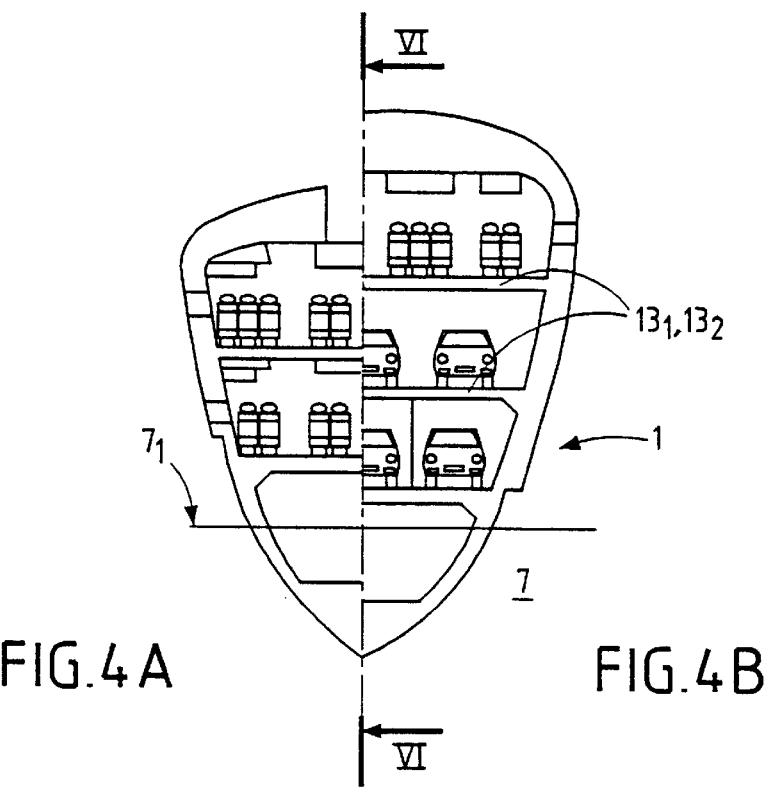
FIG. 4a and 4b are half-section views on IVa and IVb of FIG. 6.
Figure 5:
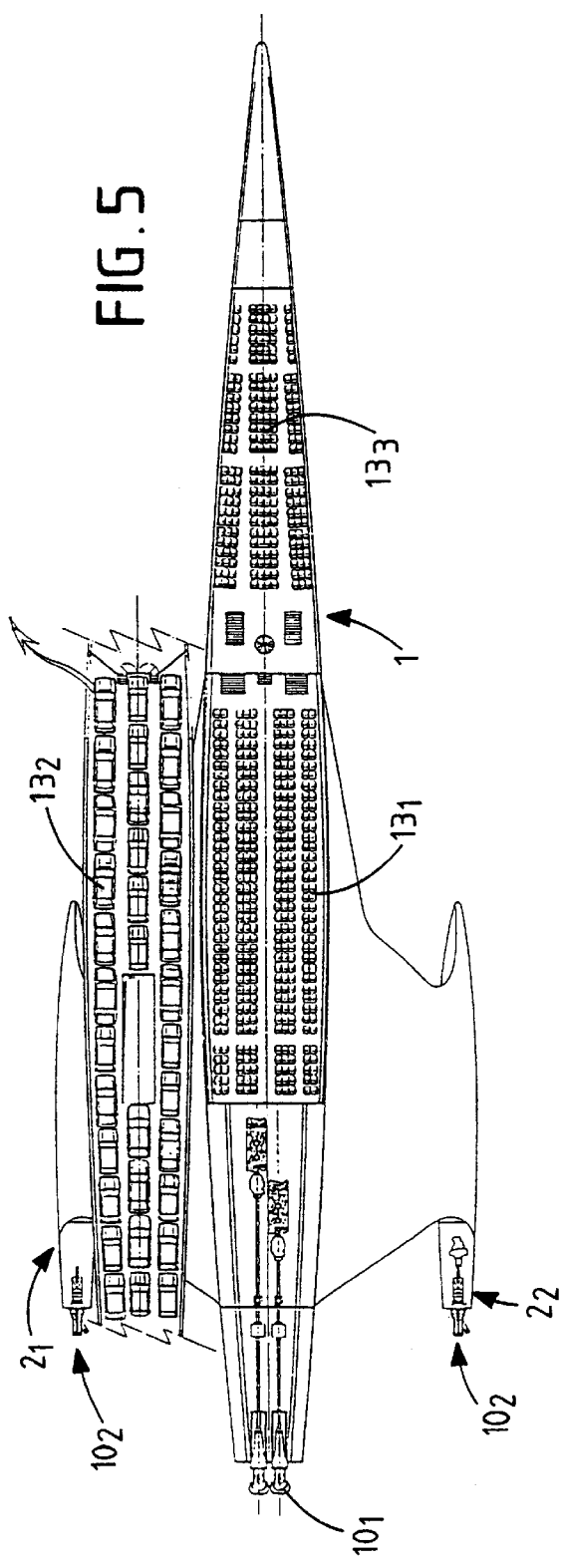
FIG. 5 is a plan view of the three deck levels referencd in FIG. 6.
Figure 6:
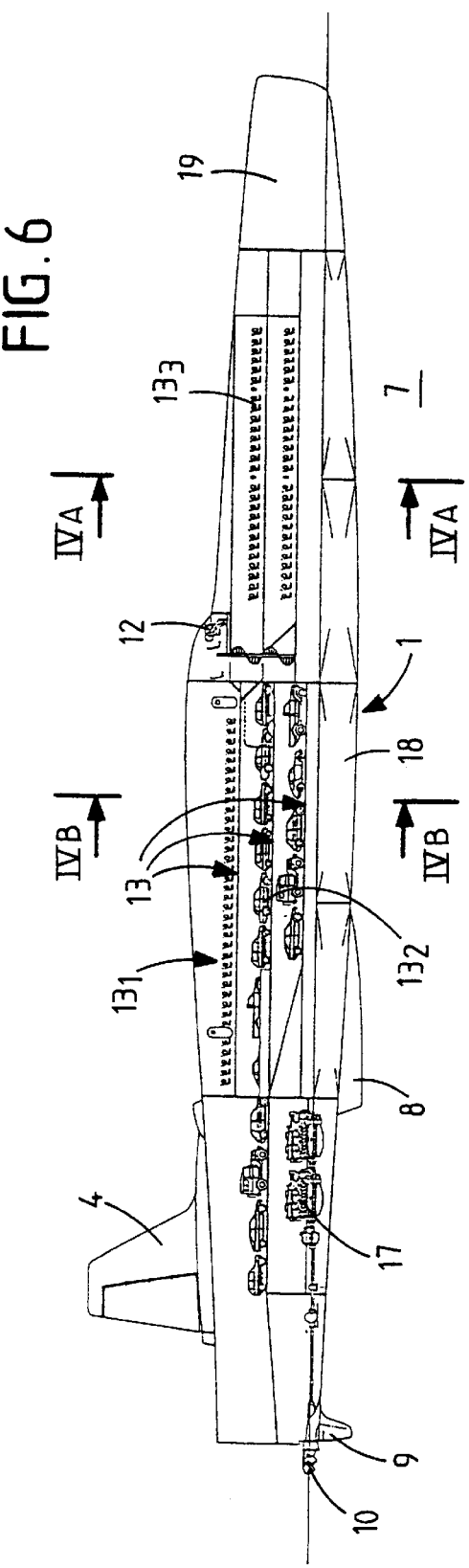
FIG. 6 is a longitudinal mid-section view on VI, VI' of the central float.

All three floats 1 and 2 remain continuously underwater, at least in part, whatever the forward speed of the ship and because of various means and shapes specific to the invention which ensure that travel takes place in a plane that remains very close to the horizontal. The central float 1 is fitted to receive passengers on passenger decks $13_1$ and $13_3$ and vehicles on other decks $13_2$ as shown in FIGS. 4 to 6. Naturally other arrangements are possible as a function of the dimensions of the central hull and of the use made of such a ship. Various viewing portholes 14 are preferably provided, at least on those decks 13 where passengers are located. A navigation and control bridge 12 is provided at the tope of the hull as a whole and is preferably installed on the central float 12 slightly ahead of the stems of the side floats 2.

The central hull 1 can have two side keels 8 fixed to the stern of its underwater portion $1_1$ and has a stern rudder 9 for steering. Beneath the decks 13, the structure of the central hull 1 comprises a double bottom 18 and towards the stern it comprises the engine room 17 in which the motor thruster units are situated which, as mentioned above, are water hydrojets whose nozzles 10 are situated at the stern portion of the hull.

Figure 7:
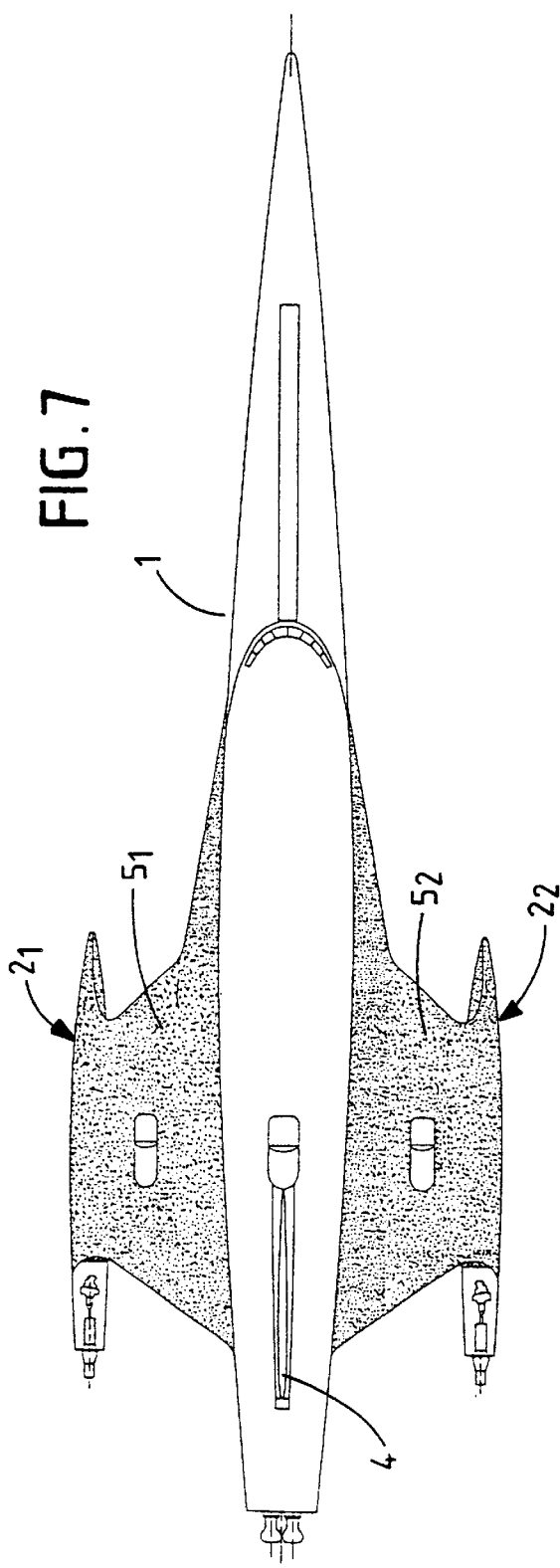
FIG. 7 is a fragmentally horizontal section view of the arms linking together the various floats.
Figure 8:
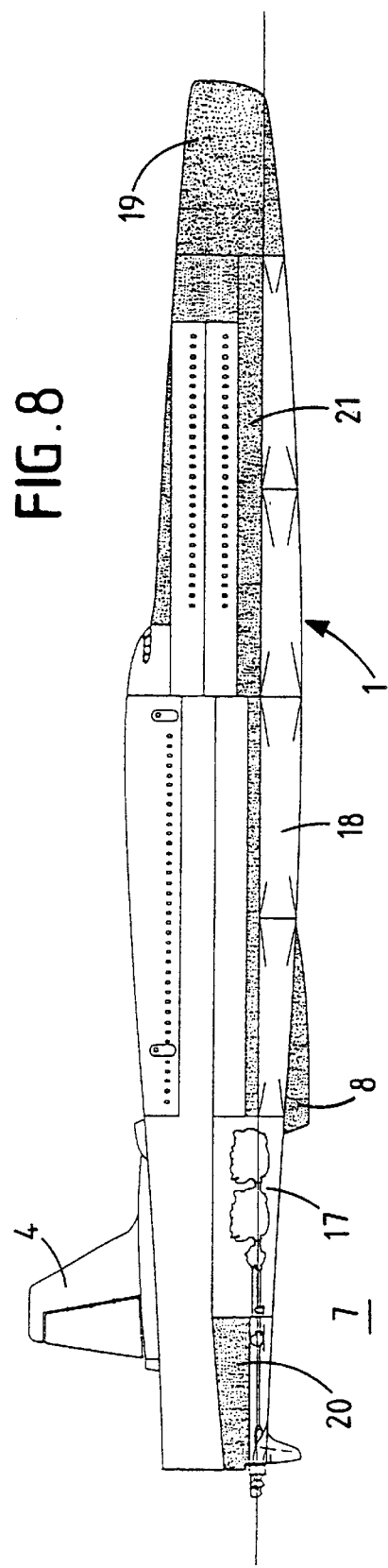
FIG. 8 is a fragmentary longitudinal section view of the central float of the invention showing the various reserve buoyancy spaces.

To provide reserve buoyancy even in the event of the hull being torn, causing all of the double bottom 18 and some of the transport volume to be invaded by water, the hull as a whole can remain afloat, with all of the unused volumes of the hull being suitable for filling with buoyancy foam in sufficient quantity to compensate for the entire weight of the ship when loaded, such as: the bow volume 19, the stern volume 20, all of the volumes 21 available between the decks 13 and the remainder of the hull, and also the volumes of the arms 5 linking the side floats 2, as shown shaded in FIGS. 7 and 8.

Vehicle access to the various decks 132 is via stern doors 15 of conventional type, and passenger access is via at least one side door 16 situated on the central float $1_2$, preferably forward of the stems of the side floats 2.

Hydrojet propulsion is performed by four thrusters 10 which are situated one in each side float 2 and two in the central float 1, with water feed inlets 11 situated towards the middles of the underwater portions of the corresponding floats so as to avoid excessively disturbing flow towards the stern portions of the floats. Thus, such inlets 11 are preferably positioned at a distance lying in the range 10% to 15% of the waterline length of the float in question, either forward or else aft of the point where the laminar boundary layer separates. The length of the inlet must be 10% to 15% of the length of the laininar boundary layer.

In addition, to facilitate maneuvering in ports, the central float 1 can include retractable bow thrusters (not shown in the accompanying figures).

Given the fineness characteristics desired for the floats as a whole and given their specific dispositions in accordance with the invention, the ratio of the immersed volume of the central float $1_1$ to the volume of the circumscribing parallelepiped enclosing the underwater portion, referred to as the "block coefficient", has a value lying in the range 0.32 and 0.34. Considering the length $L_{pp}$ between perpendiculars to the fore and aft ends of the float and its width at the greatest beam on the waterline, the ratio of the length to the width lies in the range 15 to 18 for the central float 1 having a waterline length that can lie in the range 50 meters (m) to 150 m; thus, for a length between perpendiculars $L_{pp}$ of 100 m, the width of the main beam at the waterline can be 6 m.

For the side floats 2, the block coefficient or fineness coefficient preferably lies in the range 0.26 to 0.28 with a ratio of length over width, as defined above for the central float, lying in the range 13 to 17; the ratio of the length of the central float 1 over the length of the side floats 2 lies in the range 2.5 to 4.5, and preferably in the range 2.85 to 4.

The sterns of the two side floats 2 are situated at a distance d forward of the perpendicular to the stern of the central float 1 where d lies in the range 5% to 20% of the length $L_{pp}$ of the underwater portion of the central float.

The longitudinal midplanes YY' of the side floats 2 are situated at a distance D on either side of the midplane XX' of the central float 1, where D lies in the range 10% to 15% of the length $L_{pp}$ of the underwater part of the central float 1.

Preferably, d lies in the range 10% to 15% of $L_{pp}$ and D lies in the range 12% to 14%.

All of the above-specified values or ranges for dimensions are applicable for the central float 1 having an overall length $L_{pp}$ between perpendiculars lying in the range 50 m to 150 m.

Similarly, for these hull dimensions, the area of the tail fin 4 is such that its ratio to the lateral surface area of the abovewater portion $1_2$ of the central float 1 lies in the range 0.07 to 0.09, and the area of each foil or stabilizer 3 relative to the area of the underwater portion of the corresponding float 2 lies in the range 0.025 to 0.030.

The angles of these foils 3 and of the nozzle outlets 10 are controlled by electrical controls for stabilizing the ship and associated with an inertial unit, and they are steered, for example, by a hydraulic system backed up by an emergency pneumatic system which serves at least to return the nozzles 10 to a horizontal position in the event of a problem. This dual crossed-stabilization between the foils and the nozzles, associated with the inertial unit, makes good comfort possible by controlling interfering lateral movements, it being understood that such a system has practically no effect in terms of energy consumption.

To give an order of magnitude for the displacement of ships that can be made in application of the present invention, a unit having a unit $L_{pp}$ of 62 m has a light displacement of about 190 metric tonnes, with a fully laden displacement of 240 tonnes; for a 100 m unit, the light displacement could be 485 tonnes and the fully laden displacement 680 tonnes; and for a 130 m unit, the light displacement could be about 800 tonnes for a fully laden displacement of 1200 tonnes.

What is claimed is:

1. A hull for a high-speed vessel, the hull comprising a central main float and two side floats of shorter length situated towards the stern of the central float, said side floats being connected to said central float by link arms, the three floats having underwater portions which remain under water at all speeds, the underwater portions of the side floats having foils, the three floats having fineness coefficients in the range 0.25 to 0.35 with a ratio of length over beam lying in the range 12 to 20 and a ratio of central float length to side float length in the range 2.5 to 4.5, the link arms being faired in the form of airplane wings having a mean chord and a height above the water which is between one-half and one-fourth of the mean chord, thereby creating two ground-effect nozzles between the link arms, the abovewater side surfaces of the central float, the side floats, and the surface of the water on which said hull is moving.

2. A hull according to claim 1, wherein the fineness coefficient of the central float lies in the range 0.32 to 0.34 with a length over beam ratio lying in the range 15 to 18 for a central float having a length lying in the range 50 m to 150 m.

3. A hull according to claim 1, wherein the fineness coefficient of the side floats lies in the range 0.26 to 0.28 with a ratio of length over beam lying in the range 13 to 17 for a waterline length of the central float lying in the range 50 m to 150 m.

4. A hull according to claim 1, wherein the sterns of the two side floats are situated at a distance d forward of the perpendicular to the stern of the central float where d lies in the range 5% to 20% of the waterline length of the central float.

5. A hull according to claim 1, the longitudinal midplanes (YY) of the side floats being situated at a distance D on either side of the midplane (XX) of the central float, where D lies in the range 10% to 15% of the waterline length $L_{pp}$ of the central float.

6. A hull according to claim 1, wherein said underwater foils are tiltable and suitable for being tilted so as to have an angle of incidence that is positive at all times.

7. A hull according to claim 1, including a vertical tail fin in the air at its stern.

8. A hull according to claim 1, comprising propulsion means comprising at least one waterjet exiting from the stern portion of at least the central float.

9. A hull according to claim 8, wherein said propulsion means comprises four waterjet thrusters, one on each side float and two on the central float.

10. A hull according to claim 8, wherein said propulsion means comprises a water inlet for each said waterjet, each said water inlet being located toward the middle of the respective float.

11. A hull according to claim 1, wherein said central float has a length over 100 m, the overall height above the water is less than 10 m, the link arms are 3 m to 6 m above the water, and the vessel has an overall width of 30 m to 35 m.

* * * * *